United States Patent
Wang

(10) Patent No.: US 11,710,339 B2
(45) Date of Patent: Jul. 25, 2023

(54) DUAL SENSING DEVICE

(71) Applicant: Au Optronics Corporation, Hsinchu (TW)

(72) Inventor: Shuo-Hong Wang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/739,208

(22) Filed: May 9, 2022

(65) Prior Publication Data

US 2022/0375252 A1    Nov. 24, 2022

Related U.S. Application Data

(60) Provisional application No. 63/189,960, filed on May 18, 2021.

(30) Foreign Application Priority Data

Sep. 11, 2021  (TW) .................................. 110133883

(51) Int. Cl.
   *G06V 40/13*    (2022.01)
(52) U.S. Cl.
   CPC ................................ *G06V 40/1318* (2022.01)
(58) Field of Classification Search
   CPC .......... G06V 40/1318; H01L 27/14678; H01L 27/14605; H01L 27/14623; H10K 39/32
   See application file for complete search history.

(56) References Cited

U.S. PATENT DOCUMENTS

| | | | |
|---|---|---|---|
| 10,825,995 B2 | 11/2020 | Yakushiji et al. | |
| 2009/0166411 A1* | 7/2009 | Kramer | A61B 5/1172 235/382 |
| 2017/0040550 A1 | 2/2017 | Yakushiji et al. | |
| 2018/0375033 A1 | 12/2018 | Yakushiji et al. | |
| 2021/0005669 A1 | 1/2021 | Kamada et al. | |
| 2022/0050987 A1* | 2/2022 | Chiu | H01L 27/14678 |
| 2022/0092286 A1 | 3/2022 | Wu | |

FOREIGN PATENT DOCUMENTS

| | | | |
|---|---|---|---|
| CN | 109564627 | 4/2019 | |
| CN | 112131906 | 12/2020 | |
| CN | 112464799 | 3/2021 | |
| TW | 201824080 | 7/2018 | |
| TW | 201924038 | 6/2019 | |
| TW | 202104541 | 2/2021 | |
| WO | WO-2018120441 A1 * | 7/2018 | G06F 21/32 |

* cited by examiner

*Primary Examiner* — Abhishek Sarma
(74) *Attorney, Agent, or Firm* — JCIPRNET

(57) ABSTRACT

A dual sensing device, including a first substrate, a first sensing element layer, and a second sensing element layer, is provided. The first sensing element layer is disposed on the first substrate and includes multiple first sensing elements. The second sensing element layer is disposed on the first sensing element layer and includes multiple second sensing elements, wherein an orthographic projection of the second sensing element on the first substrate overlaps with an orthographic projection of the first sensing element on the first substrate.

14 Claims, 3 Drawing Sheets

DUAL SENSING DEVICE

CROSS-REFERENCE TO RELATED APPLICATION

This application claims the priority benefit of U.S. Provisional Application No. 63/189,960, filed on May 18, 2021 and Taiwan Application No. 110133883, filed on Sep. 11, 2021. The entirety of each of the above-mentioned patent applications is hereby incorporated by reference herein and made a part of this specification.

BACKGROUND

Technical Field

The disclosure relates to a sensing device, and more particularly to a dual sensing device.

Description of Related Art

In order to provide the information needed to construct a smart living environment, various sensors, such as various optical sensors for sensing biometric features such as fingerprints, vein images, heart rate, and blood oxygen concentration, have been widely used in daily life. Due to the increasing demand for various sensors, the trend for future applications will be to integrate various sensors to provide multiple sensing functions in a single device. However, the structures of different sensors are different, so how to simplify the integrated structure of multiple sensors is still one of the goals that the related industry seeks to improve.

SUMMARY

The disclosure provides a dual sensing device with a simplified integrated structure.

An embodiment of the disclosure provides a dual sensing device, including a first substrate; a first sensing element layer, located on the first substrate and including multiple first sensing elements; and a second sensing element layer, located on the first sensing element layer and including multiple second sensing elements. An orthographic projection of the second sensing element on the first substrate overlaps with an orthographic projection of the first sensing element on the first substrate.

In an embodiment of the disclosure, the first sensing element is a visible light sensing element.

In an embodiment of the disclosure, the first sensing element is a fingerprint sensing element.

In an embodiment of the disclosure, the dual sensing device further includes a light shielding layer located on the first sensing element and having an opening. The first sensing element includes a sensing layer, and an orthographic projection of the opening on the first substrate overlaps with an orthographic projection of the sensing layer on the first substrate.

In an embodiment of the disclosure, the dual sensing device further includes a light angle control layer located on the first sensing element, and an orthographic projection of the light angle control layer on the first substrate overlaps with the orthographic projection of the first sensing element on the first substrate.

In an embodiment of the disclosure, the light angle control layer is an electrode of the second sensing element.

In an embodiment of the disclosure, the second sensing element is an infrared sensing element.

In an embodiment of the disclosure, the first sensing element and the second sensing element are invisible light sensing elements with different wavelengths.

In an embodiment of the disclosure, the second sensing element is an organic photodiode.

In an embodiment of the disclosure, the organic photodiode includes an electron transport layer, a hole transport layer, and a photosensitive layer located between the electron transport layer and the hole transport layer, and the photosensitive layer is located between the electron transport layer and the first substrate.

In an embodiment of the disclosure, the dual sensing device further has an opening region, and the first sensing element and the second sensing element are located outside the opening region.

In an embodiment of the disclosure, the dual sensing device further includes a first switching element located on the first substrate and electrically connected to the first sensing element.

In an embodiment of the disclosure, the dual sensing device further includes a second substrate. The second sensing element layer is located between the second substrate and the first sensing element layer.

In an embodiment of the disclosure, the dual sensing device further includes a second switching element located between the second sensing element layer and the second substrate, and electrically connected to the second sensing element.

In an embodiment of the disclosure, the dual sensing device further includes a light source located on one side of the first substrate opposite to the first sensing element layer.

In order for the features and advantages of the disclosure to be more comprehensible, the following specific embodiments are described in detail in conjunction with the drawings.

DETAILED DESCRIPTION OF DISCLOSED EMBODIMENTS

Figure 1:
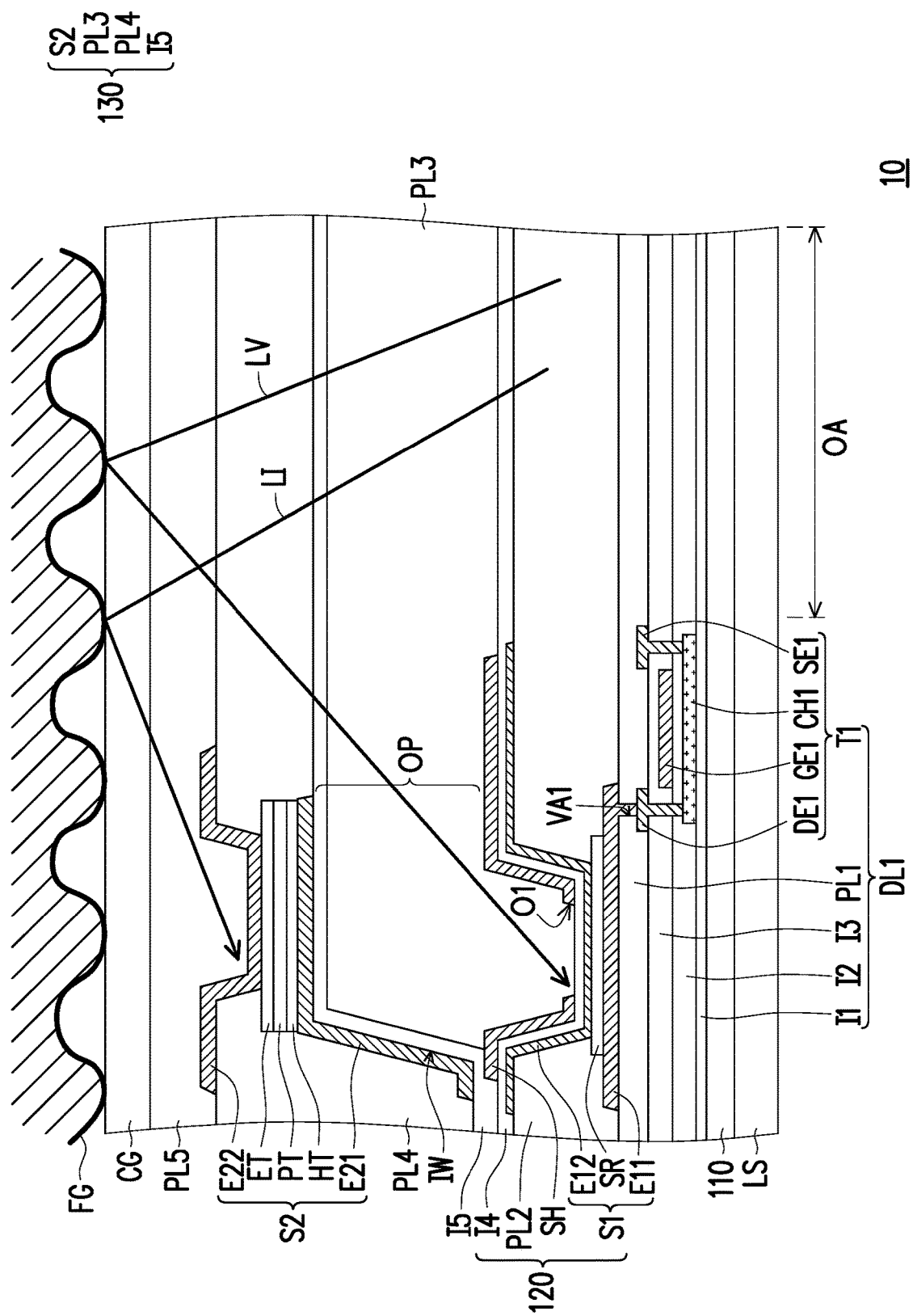
FIG. 1 is a schematic cross-sectional view of a dual sensing device 10 according to an embodiment of the disclosure.

In the drawings, the thickness of layers, films, panels, regions, etc., are exaggerated for clarity. The same reference numerals refer to the same elements throughout the specification. It will be understood that when an element such as a layer, a film, a region, or a substrate is referred to as being "on" or "connected to" another element, the element may be directly on or connected to the other element, or there may be an intermediate element therebetween. In contrast, when an element is referred to as being "directly on" or "directly connected to" another element, there is no intermediate element. As used herein, "connection" may refer to a physical and/or electrical connection. Furthermore, there may be other elements between the two elements for an "electrical connection" or "coupling".

It will be understood that although terms such as "first", "second", and "third" may be used herein to describe various elements, components, regions, layers, and/or parts, the elements, components, regions, layers, and/or parts are not be limited by the terms. The terms are only used to distinguish one element, component, region, layer, or part from another element, component, region, layer, or part. Thus, a first "element", "component", "region", "layer", or "part" discussed below may be referred to as a second element, component, region, layer, or part without departing from the teachings herein.

The terms used herein are only for the purpose of describing particular embodiments and are not limiting. As used herein, singular forms "a", "an", and "the" are intended to include plural forms, including "at least one" or representing "and/or" unless the content clearly dictates otherwise. As used herein, the term "and/or" includes any and all combinations of one or more of the related listed items. It should also be understood that when used in the specification, the terms "containing" and/or "including" designate the presence of stated features, regions, entireties, steps, operations, elements, and/or components, but do not exclude the presence or addition of one or more other features, regions, entireties, steps, operations, elements, components, and/or combinations thereof.

Furthermore, relative terms such as "lower" or "lower portion" and "upper" or "upper portion" may be used herein to describe the relationship between one element and another element, as shown in the drawings. It should be understood that relative terms are intended to include different orientations of a device in addition to the orientation shown in the drawings. For example, if the device in one of the drawings is flipped, an element described as being on the "lower" side of other elements will then be oriented on the "upper" side of the other elements. Thus, the exemplary term "lower" may include the orientations of "lower" and "upper", depending on the particular orientation of the drawing. Similarly, if the device in one of the drawings is flipped, an element described as "under" or "below" other elements will then be oriented "above" the other elements. Thus, the exemplary term "under" or "below" may include the orientations of above and below.

FIG. 1 is a schematic cross-sectional view of a dual sensing device 10 according to an embodiment of the disclosure. The dual sensing device 10 includes a first substrate 110; a first sensing element layer 120, located on the first substrate 110 and including multiple first sensing elements S1; and a second sensing element layer 130, located on the first sensing element layer 120 and including multiple second sensing elements S2, wherein an orthographic projection of the second sensing element S2 on the first substrate 110 overlaps with an orthographic projection of the first sensing element S1 on the first substrate 110.

In the dual sensing device 10 according to an embodiment of the disclosure, by the orthographic projection of the first sensing element S1 on the first substrate 110 partially overlapping or completely overlapping with the orthographic projection of the second sensing element S2 on the first substrate 110, the integrated structure of the dual sensing device 10 can be simplified, and an opening region OA of the dual sensing device 10 can be increased at the same time. Hereinafter, the implementation of each element of the dual sensing device 10 will be continued to be described with reference to FIG. 1, but the disclosure is not limited thereto.

In the embodiment, the first substrate 110 may be a transparent substrate or an opaque substrate, and the material thereof may be a ceramic substrate, a quartz substrate, a glass substrate, a polymer substrate, or other suitable materials, but not limited thereto.

In the embodiment, the first sensing element layer 120 may include multiple first sensing elements S1, a flat layer PL2, an insulating layer I4, and a light shielding layer SH, wherein the first sensing element S1 may be a visible light sensing element, such as a fingerprint sensing element, but not limited thereto. For example, the first sensing element S1 may include an electrode E11, a sensing layer SR, and an electrode E12. The sensing layer SR is located between the electrode E11 and the electrode E12, and the electrode E12 may be located between the flat layer PL2 and the insulating layer I4. The light shielding layer SH may be located on the first sensing element S1 and has an opening O1. An orthographic projection of the opening O1 on the first substrate 110 may overlap with an orthographic projection of the sensing layer SR on the first substrate 110 to control a light receiving range of the sensing layer SR. In some embodiments, the first sensing element S1 may be an invisible light sensing element.

For example, the material of the electrode E11 may be molybdenum, aluminum, titanium, copper, gold, silver, other conductive materials, or an alloy combination or a stack of two or more of the above materials. The material of the sensing layer SR may be silicon-rich oxide (SRO), silicon-rich oxide doped with germanium, or other suitable materials. The material of electrode E12 is preferably a transparent conductive material, such as indium tin oxide, indium zinc oxide, aluminum tin oxide, aluminum zinc oxide, indium gallium zinc oxide, other suitable oxides, or a stacking layer of at least two of the above. The material of the flat layer PL2 may include an organic material, such as an acrylic material, a siloxane material, a polyimide material, an epoxy material, or a stacking layer of the above materials, but not limited thereto. The material of the insulating layer I4 may include a transparent insulating material, such as silicon oxide, silicon nitride, silicon oxynitride, a stacking layer of the above materials, or other suitable materials. The material of the light shielding layer SH may include a material such as metal, metal oxide, metal oxynitride, black resin, or graphite, or a stack of the above materials, but not limited thereto.

In the embodiment, the dual sensing device 10 may further include a driving circuit layer DL1 located between the first sensing element layer 120 and the first substrate 110. The driving circuit layer DL1 may include an element or a circuit required by the dual sensing device 10, such as a driving element, a switching element, a power line, a driving signal line, a timing signal line, and a detection signal line. For example, the driving circuit layer DL1 may be formed by a thin film deposition process, a lithography process, and an etching process, and the driving circuit layer DL1 may include an active element array, wherein the active element array may include multiple first switching elements T1 arranged in an array, and the first switching elements T1 are respectively electrically connected to the first sensing elements S1.

Specifically, the driving circuit layer DL1 may include a first switching element T1, a buffer layer I1, a gate insulating layer I2, an interlayer insulating layer I3, and a flat layer PL1. The first switching element T1 may be composed of a semiconductor layer CH1, a gate GE1, a source SE1, and a drain DE1. A region where the semiconductor layer CH1 overlaps with the gate GE1 may be regarded as a channel region of the first switching element T1. The gate insulating layer I2 is located between the gate GE1 and the semiconductor layer CH1, and the interlayer insulating layer I3 is located between the source SE1 and the gate GE1 and between the drain DE1 and the gate GE1. The gate GE1 and the source SE1 may respectively receive signals from, for example, a driving element, and the electrode E11 of the first sensing element S1 may be electrically connected to the drain DE1 through a via VA1 in the flat layer PL1. For example, when the gate GE1 receives the signal and turns on the first switching element T1, the signal received by the source SE1 may be transmitted to the electrode E11 of the first sensing element S1 through the drain DE1. In other embodiments, the driving circuit layer DL1 may further include more insulating layers and conductive layers as required.

For example, the material of the semiconductor layer CH1 may include a silicon semiconductor material (such as polysilicon and amorphous silicon), an oxide semiconductor material, and an organic semiconductor material, and the materials of the gate GE1, the source SE1, and the drain DE1 may include metals with good conductivity, such as aluminum, molybdenum, titanium, copper, or an alloy or a stacking layer of the above metals, but not limited thereto.

In the embodiment, the second sensing element layer 130 is stacked on the first sensing element layer 120, and the second sensing element layer 130 may include multiple second sensing elements S2, flat layers PL3 and PL4, and an insulating layer I5, wherein the second sensing element S2 may be an invisible light sensing element, such as an infrared sensing element, so that the second sensing element S2 may be configured to, for example, sense blood oxygen concentration or capture vein images for anti-counterfeiting in vivo, or configured to capture fingerprint images. For example, the second sensing element S2 may be an organic photodiode (OPD), and the second sensing element S2 may include an electrode E21, a hole transport layer HT, a photosensitive layer PT, an electron transport layer ET, and an electrode E22, wherein the electron transport layer ET, the photosensitive layer PT, and the hole transport layer HT are located between the electrode E21 and the electrode E22, and the photosensitive layer PT may be located between the electron transport layer ET and the first substrate 110, but not limited thereto. In some embodiments, the photosensitive layer PT may be located between the hole transport layer HT and the first substrate 110. In addition, in some embodiments, the first sensing element S1 and the second sensing element S2 may both be invisible light sensing elements, and the sensing wavelength ranges of the first sensing element S1 and the second sensing element S2 may be different.

For example, the electrode E21 may be an opaque conductive material, such as a silver layer or an aluminum layer; the hole transport layer HT may include poly(3,4-ethylenedioxythiophene:polystyrene sulfonate) (PEDOT:PSS) or high work function metal oxide (such as $MoO_3$); the photosensitive layer PT may include a photosensitive polymer that absorbs in an infrared (IR) region and/or a near-infrared (NIR) region, such as poly(3-hexylthiophene):[6,6]-phenyl-C61-butyric acid methyl ester (P3HT:PCBM) or poly-(diketopyrrole-terthiophene):[6,6]-phenyl-C61-butyric acid methyl ester (PDPP3T-PCBM); the electron transport layer ET may include zinc oxide (ZnO) or aluminum zinc oxide (AZO); and the material of the electrode E22 may be a transparent conductive material, such as indium tin oxide (ITO).

In some embodiments, the first switching element T1 of the driving circuit layer DL1 may also be electrically connected to the electrode E21 or the electrode E22 of the second sensing element S2, so that the dual sensing device 10 can also use the first switching element T1 to control the signal reception of the second sensing element S2, thereby receiving the signals of the first sensing element S1 and the second sensing element S2 at different time periods by timing control.

In the embodiment, the dual sensing device 10 may further include a light source LS. The light source LS may be disposed on one side of the first substrate 110 opposite to the first sensing element layer 120, and the light source LS may include a visible light source and an invisible light source. In some embodiments, the light source LS may include multiple light emitting diodes, wherein a part of the light emitting diodes may emit a visible light LV, and another part of the light emitting diodes may emit an invisible light LI, such as infrared. For example, the visible light LV emitted by the light source LS may be reflected by a finger FG to enter the first sensing element S1, and the invisible light LI emitted by the light source LS may be reflected by the finger FG to enter the second sensing element S2.

In some embodiments, the dual sensing device 10 may further include a flat layer PL5 and a glass cover plate CG, wherein the flat layer PL5 may be located between the glass cover plate CG and the second sensing element layer 130, and a user may touch the glass cover plate CG with the finger FG thereof to perform fingerprint, finger vein anti-spoofing living biometrics, blood oxygen concentration sensing, etc.

Further, the dual sensing device 10 may have the opening region OA, wherein the first sensing element S1 and the second sensing element S2 may be located outside the opening region OA, that is, the first sensing element S1 and the second sensing element S2 are not disposed in the opening region OA. Since the orthographic projection of the first sensing element S1 on the first substrate 110 overlaps with the orthographic projection of the second sensing element S2 on the first substrate 110, the opening region OA can have an increased area. In this way, the visible light LV and the invisible light LI from the light source may reach the finger FG via the opening region OA without being blocked by the first sensing element S1 and the second sensing element S2, so that the first sensing element S1 and the second sensing element S2 can receive incident light with increased intensity and reduced noise, thereby improving the sensing performance thereof.

In the embodiment, the electrode E21 may also be used to control a light receiving angle of the sensing layer SR of the first sensing element S1, that is, the electrode E21 may be used as a light angle control layer of the first sensing element S1. For example, an orthographic projection of the electrode E21 on the first substrate 110 may overlap with the orthographic projection of the first sensing element S1 on the first substrate 110, and the electrode E21 may also extend toward the first sensing element S1 along a side wall IW of the insulating layer I5 at the same time, so that the electrode E21 can block light rays from directly above and the upper left of the first sensing element S1, and the visible light LV can only enter the sensing layer SR of the first sensing element S1 from a lateral light transmitting opening OP in the flat layer PL3 and the insulating layer I5 between the electrode E21 and the light shielding layer SH after being reflected by the finger FG. In this way, only light at a large oblique angle can enter the sensing layer SR through the openings OP and O1. It has been confirmed by experiments that such design can effectively improve the sensing effect of the first sensing element S1. In addition, the invisible light LI reflected by the finger FG may first enter the electron transport layer ET of the second sensing element S2, so that the second sensing element S2 can have better external quantum efficiency (EQE).

Hereinafter, other embodiments of the disclosure will be described using FIG. 2 to FIG. 3, and the reference numerals and the related contents of the embodiment of FIG. 1 will continue to be used, wherein the same reference numerals are used to represent the same or similar elements, and the description of the same technical content is omitted. For the description of the omitted part, reference may be made to the embodiment of FIG. 1, which will not be repeated in the following description.

Figure 2:
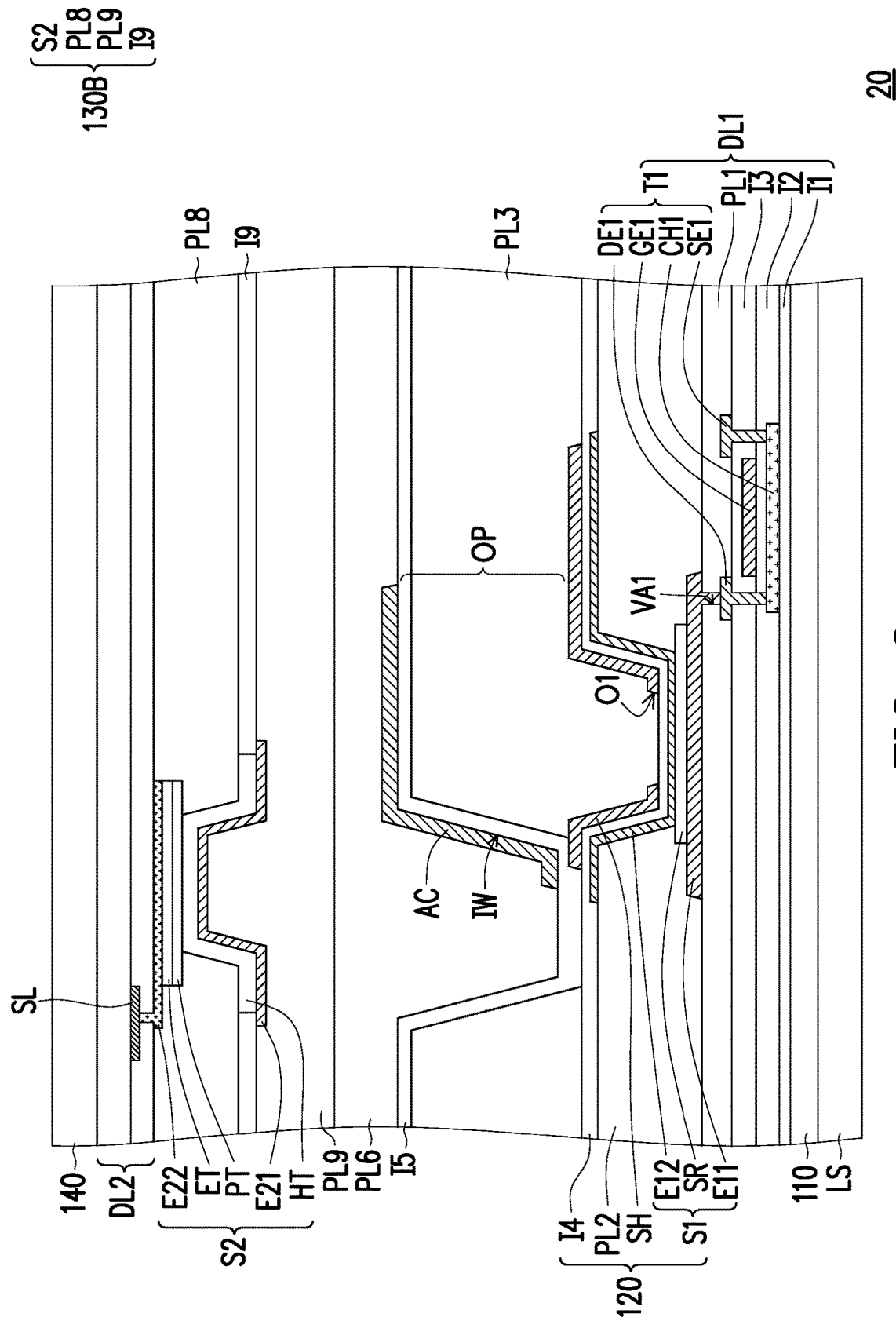
FIG. 2 is a schematic cross-sectional view of a dual sensing device 20 according to an embodiment of the disclosure.

FIG. 2 is a schematic cross-sectional view of a dual sensing device 20 according to an embodiment of the disclosure. The dual sensing device 20 includes a first substrate 110, a driving circuit layer DL1, a first sensing element layer 120, a second sensing element layer 130B, and a light source LS, and an orthographic projection of the second sensing element S2 of the second sensing element layer 130B on the first substrate 110 overlaps with an orthographic projection of the first sensing element S1 of the first sensing element layer 120 on the first substrate 110.

Compared with the dual sensing device 10 shown in FIG. 1, the dual sensing device 20 shown in FIG. 2 is different in that the dual sensing device 20 further includes a second substrate 140, wherein the second sensing element layer 130B may be located between the second substrate 140 and the first sensing element layer 120, and the first sensing element layer 120 and the second sensing element layer 130B may be respectively disposed on the first substrate 110 and the second substrate 140. In this way, the manufacturing of the dual sensing device 20 may be completed by pairing the first sensing element layer 120 disposed on the first substrate 110 and the second sensing element layer 130B disposed on the second substrate 140.

In the embodiment, the second sensing element layer 130B may include multiple second sensing elements S2, flat layers PL8 and PL9, and an insulating layer I9, and the flat layer PL9 may be located between the second sensing element S2 and the first sensing element layer 120. An electron transport layer ET of the second sensing element S2 may be located between the photosensitive layer PT and the second substrate 140.

In the embodiment, the dual sensing device 20 may further include a light angle control layer AC, and the light angle control layer AC may be located between the insulating layer I5 and the flat layer PL6. Specifically, an orthographic projection of the light angle control layer AC on the first substrate 110 may overlap with the orthographic projection of the first sensing element S1 on the first substrate 110. Particularly, the light angle control layer AC may overlap with an opening O1 of a light shielding layer SH, and the light angle control layer AC may also extend toward the first sensing element S1 along a side wall IW of the insulating layer I5 at the same time, so that the light angle control layer AC can block light rays from directly above and the upper left of the first sensing element S1. In this way, only light at a large oblique angle can enter a sensing layer SR through openings OP and O1, so that the sensing effect of the first sensing element S1 can be improved.

In some embodiments, the dual sensing device 20 may further include a driving circuit layer DL2 located between the second sensing element layer 130B and the second substrate 140. The driving circuit layer DL2 may include an element or a circuit required by the dual sensing device 20, such as a signal line SL, and an electrode E22 of the second sensing element S2 may be electrically connected to the signal line SL. In some embodiments, the second sensing element S2 may be electrically connected to a first switching element T1 of the driving circuit layer DL1 via the signal line SL and/or a peripheral trace.

Figure 3:
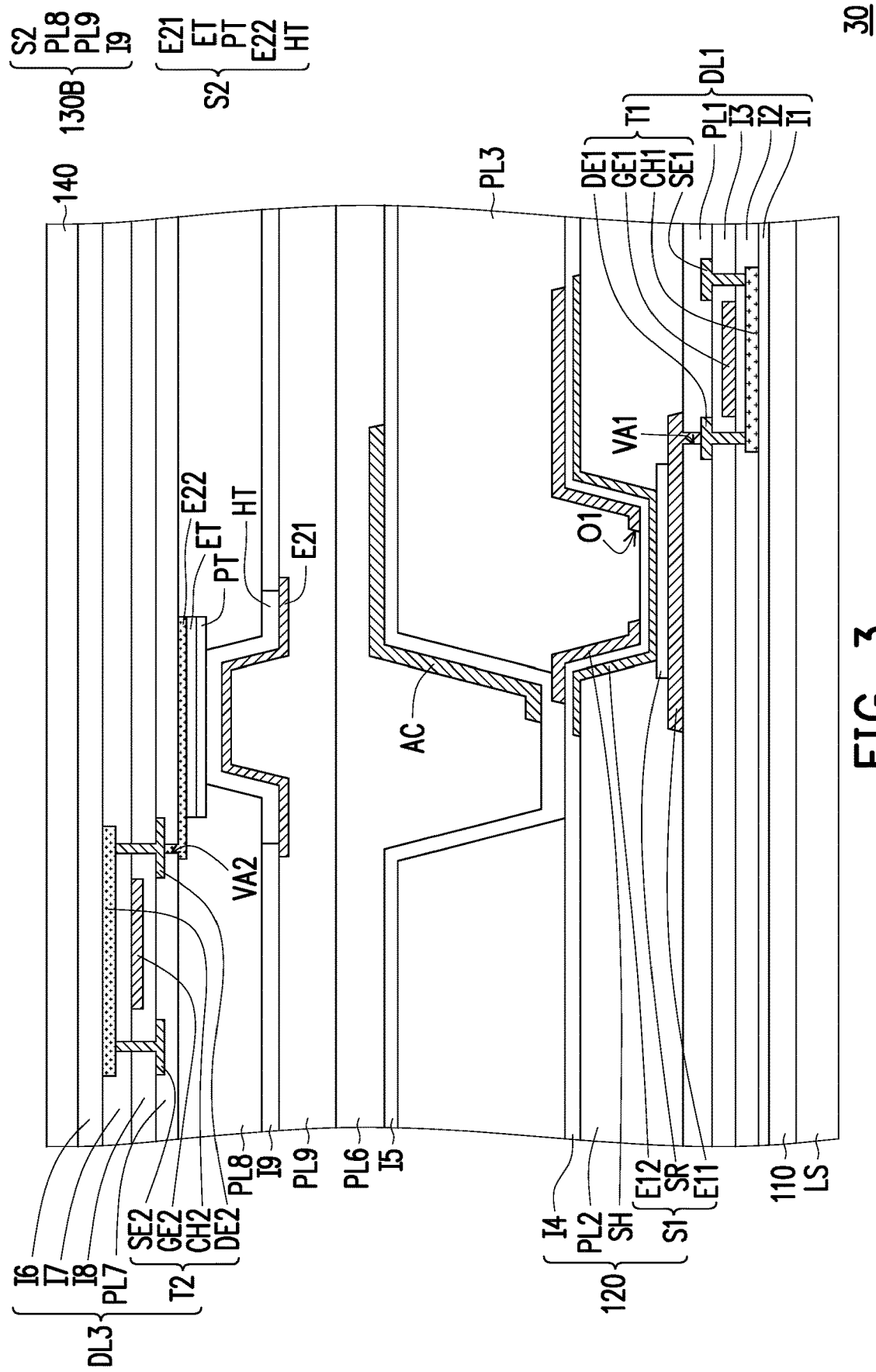
FIG. 3 is a schematic cross-sectional view of a dual sensing device 30 according to an embodiment of the disclosure.

FIG. 3 is a schematic cross-sectional view of a dual sensing device 30 according to an embodiment of the disclosure. The dual sensing device 30 includes a first substrate 110, a driving circuit layer DL1, a first sensing element layer 120, a second sensing element layer 130B, a light source LS, a second substrate 140, and a light angle control layer AC, and an orthographic projection of the second sensing element S2 of the second sensing element layer 130B on the first substrate 110 overlaps with an orthographic projection of the first sensing element S1 of the first sensing element layer 120 on the first substrate 110.

Compared with the dual sensing device 20 shown in FIG. 2, the dual sensing device 30 shown in FIG. 3 is different in that the dual sensing device 30 further includes a driving circuit layer DL3 located between the second sensing element layer 130B and the second substrate 140, and the driving circuit layer DL3 may include multiple second switching elements T2 arranged in an array.

For example, in this embodiment, the driving circuit layer DL3 may include a second switching element T2, a buffer layer I6, a gate insulating layer I7, an interlayer insulating layer I8, and a flat layer PL7. The second switching element T2 may be composed of a semiconductor layer CH2, a gate GE2, a source SE2, and a drain DE2, and an electrode E22 of the second sensing element S2 may be electrically connected to the drain DE2 through a via VA2 in the flat layer PL7, so that the dual sensing device 30 can use the first switching element T1 and the second switching element T2 to respectively control the signal reception of the first sensing element S1 and the second sensing element S2. The structure of the second switching element T2 may be similar to that of the first switching element T1, and the details are not repeated here.

In addition, the materials of the buffer layers I1 and I6, the gate insulating layers I2 and I7, the interlayer insulating layers I3 and I8, and the insulating layers I4, I5, and I9 may include transparent insulating materials, such as silicon oxide, silicon nitride, silicon oxynitride, or a stacking layer of the above materials, but the disclosure is not limited thereto. The materials of the flat layers PL1 to PL9 may include transparent insulating materials, such as organic materials, acrylic materials, siloxane materials, polyimide materials, and epoxy materials, but not limited thereto. The buffer layers I1 and I6, the gate insulating layers I2 and I7, the interlayer insulating layers I3 and I8, the insulating layers I4, I5, and I9, and the flat layers PL1 to PL9 may also respectively have a single-layer structure or a multi-layer structure. The multi-layer structure is, for example, a stacking layer of any two layers or more layers of the above insulating materials, which may be combined and changed as required.

In summary, in the dual sensing device of the disclosure, the orthographic projection of the second sensing element of the second sensing element layer on the first substrate overlaps with the orthographic projection of the first sensing element of the first sensing element layer on the first substrate, which can simplify the integrated structure of the dual sensing device, and increase the opening region of the dual sensing device at the same time, thereby improving the sensing effect of the sensing element.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A dual sensing device, comprising:
a first substrate;
a first sensing element layer, located on the first substrate and comprising a plurality of first sensing elements;
a second sensing element layer, located on the first sensing element layer and comprising a plurality of second sensing elements, wherein an orthographic projection of the second sensing element on the first substrate overlaps with an orthographic projection of the first sensing element on the first substrate;
and a light shielding layer located on the first sensing element and having an opening, wherein the first sensing element comprises a sensing layer, and an orthographic projection of the opening on the first substrate overlaps with an orthographic projection of the sensing layer on the first substrate.

2. The dual sensing device according to claim 1, wherein the first sensing element is a visible light sensing element.

3. The dual sensing device according to claim 1, wherein the first sensing element is a fingerprint sensing element.

4. The dual sensing device according to claim 1, further comprising a light angle control layer located on the first sensing element, wherein an orthographic projection of the light angle control layer on the first substrate overlaps with the orthographic projection of the first sensing element on the first substrate.

5. The dual sensing device according to claim 4, wherein the light angle control layer is an electrode of the second sensing element.

6. The dual sensing device according to claim 1, wherein the second sensing element is an infrared sensing element.

7. The dual sensing device according to claim 1, wherein the first sensing element and the second sensing element are invisible light sensing elements with different wavelengths.

8. The dual sensing device according to claim 1, wherein the second sensing element is an organic photodiode.

9. The dual sensing device according to claim 8, wherein the organic photodiode comprises an electron transport layer, a hole transport layer, and a photosensitive layer located between the electron transport layer and the hole transport layer, and the photosensitive layer is located between the electron transport layer and the first substrate.

10. The dual sensing device according to claim 1, further having an opening region, wherein the first sensing element and the second sensing element are located outside the opening region.

11. The dual sensing device according to claim 1, further comprising a first switching element located on the first substrate and electrically connected to the first sensing element.

12. The dual sensing device according to claim 1, further comprising a second substrate, wherein the second sensing element layer is located between the second substrate and the first sensing element layer.

13. The dual sensing device according to claim 12, further comprising a second switching element located between the second sensing element layer and the second substrate, and electrically connected to the second sensing element.

14. The dual sensing device according to claim 1, further comprising a light source located on one side of the first substrate opposite to the first sensing element layer.

* * * * *